US009016238B2

(12) United States Patent
Duke

(10) Patent No.: US 9,016,238 B2
(45) Date of Patent: *Apr. 28, 2015

(54) MILKING EQUIPMENT AND METHOD

(75) Inventor: James Richard John Duke, Chichester (GB)

(73) Assignee: An Udder IP Company Ltd., Slindon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,355

(22) Filed: May 19, 2011

(65) Prior Publication Data

US 2011/0232575 A1    Sep. 29, 2011

Related U.S. Application Data

(63) Continuation of application No. 10/576,744, filed as application No. PCT/GB2004/004343 on Oct. 13, 2004, now Pat. No. 7,963,249.

(60) Provisional application No. 60/566,314, filed on Apr. 29, 2004, provisional application No. 60/566,313, filed on Apr. 29, 2004.

(30) Foreign Application Priority Data

| Oct. 22, 2003 | (GB) | 0324647.7 |
| Jan. 30, 2004 | (GB) | 0402119.2 |
| Apr. 22, 2004 | (GB) | 0408968.6 |
| Aug. 4, 2004 | (GB) | 0417392.8 |

(51) Int. Cl.
*A01J 5/08* (2006.01)
*A01J 7/02* (2006.01)
(Continued)

(52) U.S. Cl.
CPC .... *A01J 5/08* (2013.01); *A01J 7/02* (2013.01); *A01J 7/025* (2013.01); *A01J 7/04* (2013.01); *B08B 9/00* (2013.01); *F16K 7/17* (2013.01)

(58) Field of Classification Search
CPC .................. A01J 5/06; A01J 5/08; A01J 7/02
USPC .......... 119/14.08, 14.32, 14.47, 14.51, 14.54, 119/14.55, 14.18; 604/74
See application file for complete search history.

(56) References Cited

U.S. PATENT DOCUMENTS

| 2,532,088 A | 11/1950 | Cordis |
| 3,099,246 A | 7/1963 | Beskow |

(Continued)

FOREIGN PATENT DOCUMENTS

| DE | 2 622 794 | 12/1977 |
| DE | 261300 AI | 10/1988 |

(Continued)

OTHER PUBLICATIONS

International Search Report for International Application No. PCT/GB2006/003455, mailed Jan. 3, 2007.
(Continued)

*Primary Examiner* — Rob Swiatek
*Assistant Examiner* — Danielle Clerkley
(74) *Attorney, Agent, or Firm* — Alston & Bird LLP

(57) ABSTRACT

A teat cup has a nozzle in a head portion of a flexible liner of the teat cup for delivering fluid internally of the teat cup. The nozzle is directed so as to discharge fluid towards the discharge end of the teat cup. When milking is terminated, treatment fluid is injected through the nozzle into the head portion of the liner just prior to and/or as the teat cup is being withdrawn from the teat and, the teat cup wipes the fluid down the teat so as substantially to coat the teat. When the teat cup falls into an inverted rest position, after take-off, the interior of the liner may be flushed and dried with disinfectant, water and compressed air discharged upwardly into the liner by the nozzle. The discharge end of the teat cup may be fitted with a shut-off valve which can be actuated to prevent ingress of treatment and cleansing fluids into the milk tubes during the treatment and cleansing cycle.

10 Claims, 3 Drawing Sheets

(51) Int. Cl.
*A01J 7/04* (2006.01)
*B08B 9/00* (2006.01)
*F16K 7/17* (2006.01)

(56) References Cited

U.S. PATENT DOCUMENTS

| | | | |
|---|---|---|---|
| 3,482,547 | A | 12/1969 | Maier |
| 3,696,790 | A | 10/1972 | Albright |
| 3,713,423 | A | 1/1973 | Sparr, Sr. |
| 4,332,215 | A | 6/1982 | Larson |
| 4,393,811 | A | 7/1983 | Bodmin |
| 4,395,971 | A | 8/1983 | Happel et al. |
| 4,498,419 | A | 2/1985 | Flocchini |
| 4,516,530 | A | 5/1985 | Reisgies et al. |
| 4,572,105 | A | 2/1986 | Chowdhury et al. |
| 4,924,809 | A | 5/1990 | Verbrugge |
| 5,161,482 | A | 11/1992 | Griffin |
| 5,386,799 | A | 2/1995 | Dietrich |
| 5,403,005 | A | 4/1995 | Avila-Valdez |
| 5,673,650 | A | 10/1997 | Mottram et al. |
| 5,850,845 | A | 12/1998 | Pereira et al. |
| 6,098,570 | A | 8/2000 | Aurik et al. |
| 6,234,110 | B1 | 5/2001 | Xavier |
| 6,308,655 | B1 | 10/2001 | Oosterling |
| 6,318,299 | B1 | 11/2001 | Birk |
| 6,321,682 | B1 | 11/2001 | Eriksson et al. |
| 6,435,132 | B1 | 8/2002 | Milbrath et al. |
| 6,550,420 | B1 | 4/2003 | Bjork |
| 6,561,126 | B2 | 5/2003 | Forsen et al. |
| 6,584,930 | B2 | 7/2003 | Buecker |
| 6,644,240 | B1 | 11/2003 | Dietrich |
| 6,755,153 | B1 | 6/2004 | Chowdhury |
| 6,935,270 | B2 | 8/2005 | Wipperfurth et al. |
| 6,997,136 | B1 | 2/2006 | Coates |
| 7,178,480 | B2 | 2/2007 | Dahl et al. |
| 7,281,493 | B2 | 10/2007 | Dietrich |
| 7,290,497 | B2 | 11/2007 | Rottier et al. |
| 7,401,573 | B2 | 7/2008 | Torgerson |
| 2002/0185071 | A1 | 12/2002 | Guo |
| 2003/0070621 | A1* | 4/2003 | Dahl et al. ............ 119/14.47 |
| 2005/0045108 | A1 | 3/2005 | Wipperfurth et al. |
| 2005/0274327 | A1 | 12/2005 | Johnsson et al. |
| 2007/0215053 | A1 | 9/2007 | Duke |

FOREIGN PATENT DOCUMENTS

| | | |
|---|---|---|
| EP | 0 277 396 | 8/1988 |
| EP | 0 527 509 A2 | 2/1993 |
| EP | 0 543 463 | 5/1993 |
| EP | 0 728 412 A1 | 8/1996 |
| EP | 0 801 893 A2 | 10/1997 |
| EP | 0 945 057 A1 | 9/1999 |
| EP | 1 790 217 A2 | 5/2007 |
| EP | 1 795 069 A2 | 6/2007 |
| NL | 1016237 | 3/2002 |
| WO | WO 01/17337 A1 | 3/2001 |
| WO | WO 02/23976 A1 | 3/2002 |
| WO | WO 03/030630 A1 | 4/2003 |
| WO | WO 03/098998 | 12/2003 |
| WO | WO 2005/043986 A1 | 5/2005 |
| WO | WO 2005/072516 A1 | 8/2005 |
| WO | WO 2005/102035 A2 | 11/2005 |
| WO | WO 2007/129884 A1 | 11/2007 |
| WO | WO 2007/129888 A1 | 11/2007 |

OTHER PUBLICATIONS

Written Opinion for International Application No. PCT/GB2006/003455, issued Mar. 18, 2008.
Office Action for U.S. Appl. No. 12/712,787, mailed Jun. 27, 2011.
Grindal, R. J. et al., *Automatic Application of Teat Disinfectant Through the Milking Machine Cluster,* Journal of Dairy Research, 56, 1989, pp. 579-585.
Akam, D. N., *The Development of Equipment for the Mechanization of Manual Operations in Machine Milking,* Proceedings of the International Symposium on Machine Milking, 17th Annual Meeting National Mastitis Council, Inc., Feb. 1978, pp. 417-426.
Examination Report issued in connection with European Patent Application No. 05 736 061.2, mailed Jan. 19, 2011.
Thompson, P.D., et al.; "The End-of-Milking Sequence and its Mechanization"; Paper No. 76-3566 Presented at the 1976 Winter Meeting of American Society of Agricultural Engineers; Chicago, Illinois; Dec. 1976; XP008130552; Cover Page and 14 sheets.

* cited by examiner

MILKING EQUIPMENT AND METHOD

CROSS REFERENCE TO RELATED APPLICATION

This application is a continuation of U.S. patent application Ser. No. 10/576,744, filed Feb. 15, 2008, which claims priority to and the benefit of International Application No. PCT/GB2004/004343, filed Oct. 13, 2004, which claims priority to Great Britain Application No. 0324647.7, filed Oct. 22, 2003, Great Britain Application No. 0402119.2 filed Jan. 30, 2004, Great Britain Application No. 0408968.6, filed Apr. 22, 2004, U.S. Provisional Application No. 60/566,313, filed Apr. 29, 2004, U.S. Provisional Application No. 60/566,314, filed Apr. 29, 2004, and Great Britain Application No. 0417392.8, filed Aug. 4, 2004; the contents of all of which as are hereby incorporated by reference in their entirety.

BACKGROUND OF THE INVENTION

The present invention relates to milking equipment and, more particularly, to devices and methods for enabling the application of treatment fluid to animals' teats and the treatment and cleansing of teat cups, post milking.

Conventionally, automatic milking equipment installed in a milking parlour comprises a milking point at each animal stall within the parlour. Each milking point includes a milking cluster of teat cups for connecting the equipment to the teats of an animal to be milked. In the case of cows, for example, each milking cluster has four teat cups. Each teat cup comprises a hollow shell supporting a flexible liner which has a barrel portion for engaging about a teat and, at its upper end, has a head portion with a mouth through which the teat is engaged with the barrel of the liner. At the opposite, discharge end of the teat cup, the liner communicates with a flexible, short milk tube connected to a, so called, clawpiece of the cluster where the milk extracted from the animals teats is collected and delivered, via a flexible, long milk tube, to the collection chamber of the equipment. Upon commencement of milking, a vacuum is applied to the teat cups, via the long milk tube, the clawpiece and the short milk tubes, for the purposes of extracting milk from the teat cups. This vacuum also leaks between the barrel of the liner and the engaged teat and is applied to a void formed about the teat in the head of the liner in order to capture the cup on the teat. Milking is achieved by automatically and alternately applying vacuum and atmospheric pressure pulses to the space between the shell and the liner of each teat cup in order to flex the liner and stimulate discharge of milk from the engaged teat. The clawpiece includes a distributor for distributing the pneumatic pulses to the individual teat cups, via flexible pneumatic lines, as well as for distributing disinfectant and other treatment fluid, water and compressed air to the individual teat cups for the purposes of treating and cleansing the teats and teat cups.

After completion of a milking cycle, the milking cluster at each milking point is withdrawn from the teats (commonly referred to as "take-off") such as by an automatic cluster remover, and the animal's teats are manually or automatically treated with disinfectant and conditioning fluid, such as, iodine or chlorohexadine and an emollient. The manual dipping, spraying and otherwise washing of teats and teat cups with disinfectant and cleansing fluid is labour intensive and has the additional drawbacks that the washing process may not be carried out in a timely fashion and the quality of the washing may be variable dependent upon the operator. Automatic systems which are currently available for mechanically spraying disinfectant and washing fluid onto teats and into teat cups tend to give variable results. Moreover, whether manual or mechanical spraying is utilised, the resulting vapour or spray mist may pose a health risk.

An automatic system for disinfecting at least the lower parts of teats engaged with teat cups and also the teat cups, themselves, upon completion of a milking cycle, is described in DE-A2 622 794. In this system, each teat cup has a nozzle arranged to inject sanitising fluid into the lower part of the barrel of the teat cup liner at a position below the engaged teat. The nozzle is directed upwardly in order to discharge the sanitising fluid toward the engaged teat. It is connected to a source of sanitising fluid which is operated to inject the sanitising fluid into the teat cup, upon completion of milking and whilst the teat cup is engaged with and being removed from the teat.

A system for automatically cleansing teat cups subsequent to milking, is described in EP-A-0 543 463. Each teat cup has a tube for supplying cleansing fluid to the interior of the teat cup liner connected to the short milk tube at a point near the liner. This supply tube is arranged to inject a stream of cleansing fluid into the liner in a direction towards the mouth of the liner. The cleansing fluid is injected into each teat cup after withdrawal of the teat cups from a cow and when the teat cups are hanging with their mouths downwardly, in a rest position. Hence, the cleansing fluid is squirted downwardly into the milk line and via the inside wall of the liner to the mouth of the liner. The teat cup may alternately be flushed several times with cleansing fluid and compressed air for blowing clean and drying the teat cup.

BRIEF SUMMARY OF THE INVENTION

An object of the present invention is to alleviate the drawbacks associated with current techniques employed for disinfecting and washing animal teats and teat cups, after milking. Other objects are to simplify the processes of treating and cleansing an animal's teat and a teat cup, post-milking, and to simplify the construction of the teat cup and associated components for conducting the treatment and cleansing process.

To this end, the invention consists in a teat cup comprising a flexible liner for engaging about a teat of an animal to be milked, said liner having a head portion, at one end, provided with a mouth through which the teat is engageable with the liner, and a milk discharge passageway at the opposite end, and nozzle means for discharging fluid into the liner, characterised in that said nozzle means is arranged to discharge fluid into the head portion of the liner.

The invention also consists in a method of milking comprising the steps of applying a teat cup to a teat of an animal to be milked, said teat cup including a flexible liner engaging about the teat and having a head portion, at one end, provided with a mouth through which the teat is engaged with the liner, and a milk discharge passageway at the opposite end, activating the cup to perform a milking operation, and discharging treatment fluid into the liner and withdrawing the teat cup from the teat when milking is terminated, characterised in that the treatment fluid is discharged into the head portion of the teat cup and on to the teat prior to and/or as the teat cup is withdrawn, such that withdrawal of the teat cup from the teat wipes the fluid down the teat.

With the invention, treatment fluid may be injected manually or automatically into the head portion of the teat cup liner. The injection of treatment fluid at this position, just prior to and/or during withdrawal of the cup from the teat enables the teat cup to wipe the injected fluid down the teat as the teat cup is withdrawn, and substantially coat the teat with the fluid. As a result, the teat is coated immediately after milking thereby giving protection before the teat is exposed to the environment. Moreover, any vapourised liquid is contained within the head of the liner thereby reducing the emission of vapour and spray mist associated with known manual and automatic spray devices with consequent reduction of the health risk. The process of discharging treatment fluid into the head of the liner can be fully automated saving labour costs and affording the operator more time to spend on pre-milking routines. Furthermore, the invention renders the treatment process economical in fluid use and the amount of fluid used can be calibrated so as to minimise waste and also any environmental impact.

When the invention is used with automatic milking equipment, the discharge of the treatment fluid into the head portions of the liners and about the animal's teats may be initiated for example, in response to a signal initiating automatic cluster removal. The fluid is thereby applied to the teats and is coated over the latter as the teat cups are withdrawn and wipe down the teats. After take-off, the teat cups may be flushed or rinsed internally and dried, for example, with disinfectant, water and compressed air. Hitherto, this has typically been done by back flushing, or internally rinsing the teat cups, via flush valves connecting the short milk tubes to the discharge ends of the teat cups. Upon take off, the milking cluster is designed so as to enable the short milk tubes to fall away from the centre line of the cluster so that the teat cups are inverted and hang with their heads downwardly from the claw device in a rest position. Back flushing is performed with the teat cups in this position. Consequently, fluid can escape through the mouths of the teat cups.

According to a feature of the present invention, the nozzle means is arranged to discharge fluid into the head portion of the liner in a direction towards the discharge end or passageway of the liner. Hence, when the teat cup is allowed to fall into its inverted rest position, after take-off, with the head portion of the teat cup being directed downwardly, the interior of the liner may be flushed with fluid discharged upwardly into the barrel of the liner from the head portion. The flushing fluid can then drain downwardly from the interior of the liner and through its mouth.

Consequently, in addition to enabling treatment fluid to be discharged into the head of the teat cup liner so that the engaged teat is coated with fluid during take-off, the teat cup of the invention may serve the dual purpose of enabling sanitising, washing and drying of the teat cup liner after take-off by the injection of fluid upwardly into the liner when the teat cup falls into its rest position with its head downwardly.

During treatment and cleansing of the teats and teat cups, there is a risk that the fluids used may contaminate the harvested milk if they are not physically prevented from entering the short milk tube. Hence, the teat cup according to the invention may be used with a shut-off valve which is connected to the discharge passageway of the liner and which can be actuated to prevent ingress of treatment and cleansing fluids into the milk tubes when, subsequent to milking, such fluids are discharged into the teat cup. Conveniently, the shut-off valve is mounted on the teat cup at the discharge end of the liner.

In the event that a teat cup becomes entangled upon take-off and is held in a head up attitude, a non-return bleed valve may be disposed adjacent and upstream of the shut off valve in order to allow liquid to drain from liner.

Preferably, the nozzle means is supplied with fluid via a non-return valve which may be disposed in the delivery tube supplying fluid to the nozzle means. This is desirable in order to avoid the vacuum occurring within the head of one teat cup of a milking cluster from affecting that in another one of the cups of the cluster when there is a difference in the degree of vacuum occurring within the teat cups as a result of the vacuum applied to the milk tubes for extracting milk from the teat cups. Differences in the degree of vacuum may occur, for example, because of the different sizes of the teats engaged by the teat cups of the cluster.

BRIEF DESCRIPTION OF THE DRAWINGS

In order that the present invention may be more readily understood, reference will now be made to the accompanying drawings, in which.

DETAILED DESCRIPTION OF THE DRAWINGS

Figure 1:
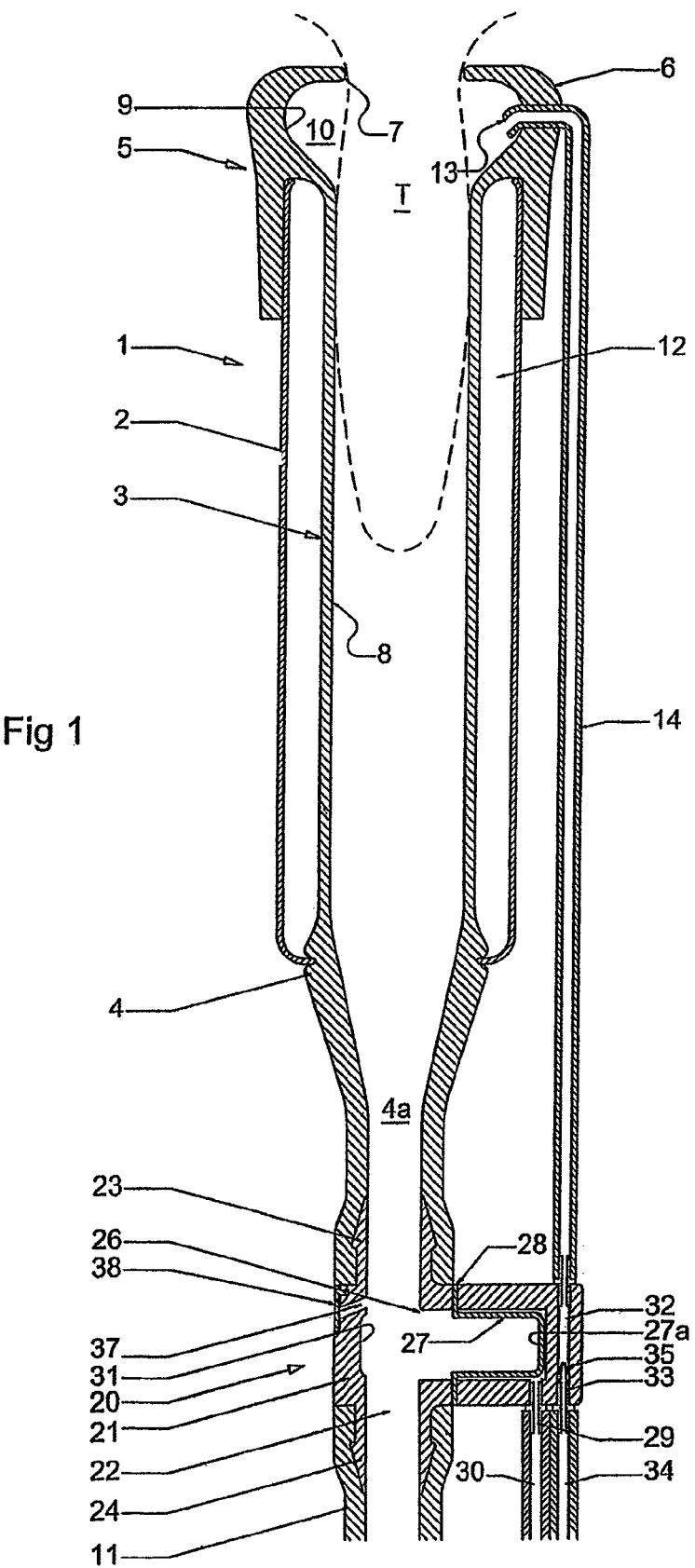
FIG. 1 is an axial section through a teat cup and associated shut off valve, when in the milking position, with the valve being shown in an unactuated condition.
Figure 2:
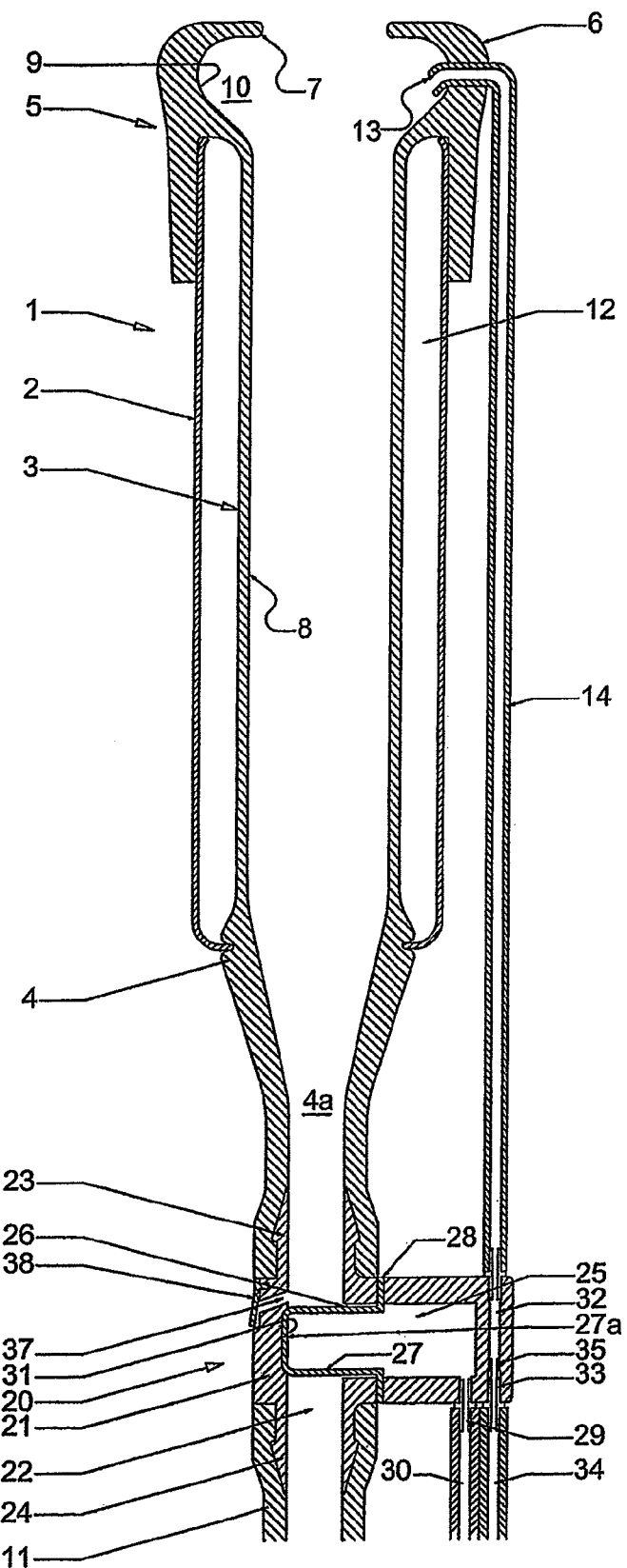
FIG. 2 is a view similar to FIG. 1 showing the valve in an actuated condition.
Figure 3:
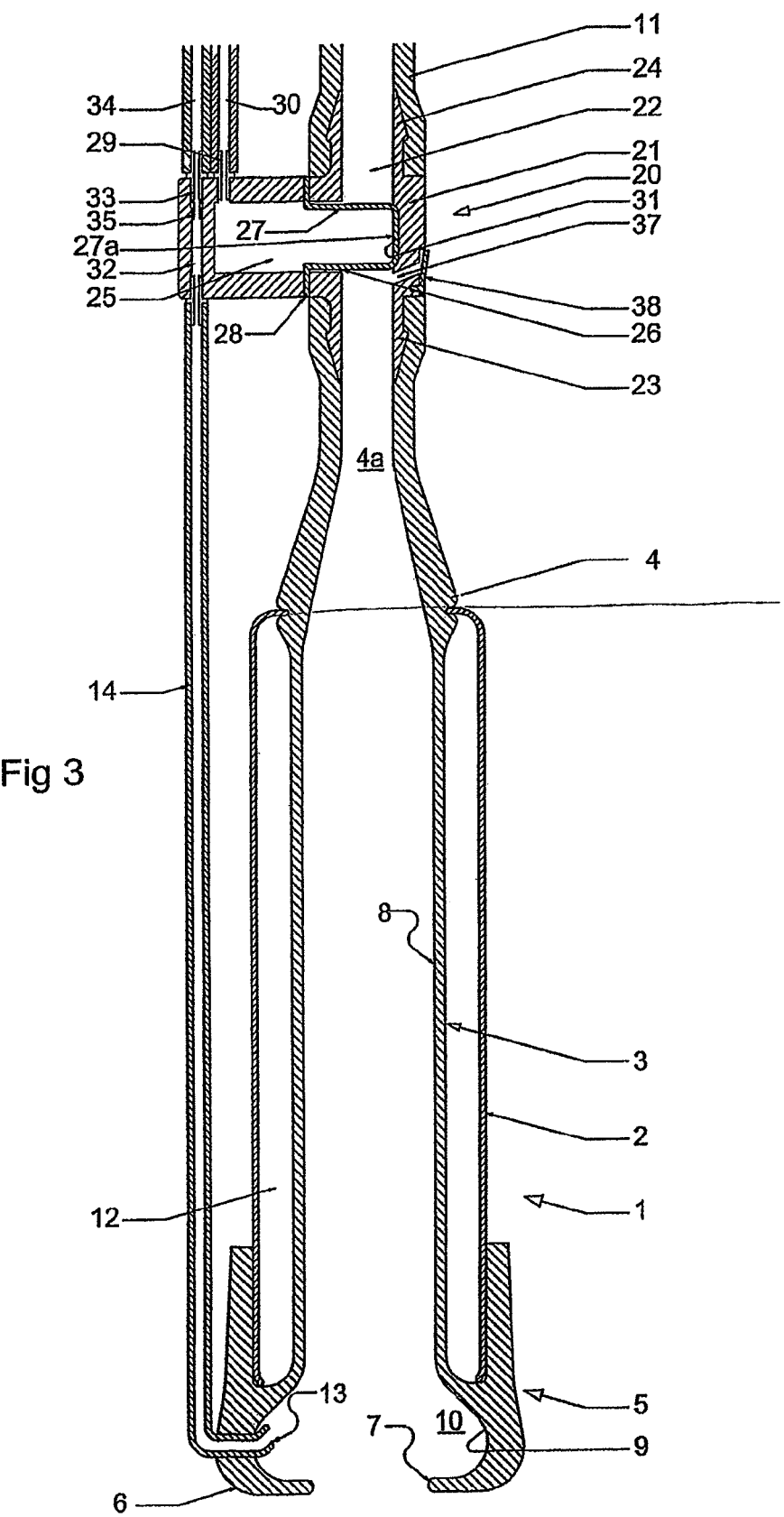
FIG. 3 is a view similar to FIG. 2 showing the valve and teat cup in the inverted rest position which the teat cup is designed to adopt after take off.

The teat cup illustrated in FIGS. 1, 2 and 3 of the accompanying drawings is one of four similar teat cups of a milking cluster used for milking a cow and which is connected to automatic milking equipment. Each teat cup 1 comprises a hollow cylindrical shell 2 supporting a flexible liner 3 in spaced relation with the shell. As viewed in FIGS. 1 and 2, the liner has a cylindrical barrel portion 8 sealed to the shell adjacent the bottom, discharge end 4 and adjacent the top or head end 5 of the cup. At the latter end, the liner has a head portion 6 which engages about the outside of the shell in order to seal the shell to the head end of the barrel, and which projects above the adjacent end of the shell. The head 6 of the liner is formed with a mouth 7 permitting access to the interior of the liner. Between the top of the barrel 8 of the liner and the mouth 7, the head of the liner is formed with an internal annular cavity 9 which, when an animal's teat is inserted into the cup through the opening 7, forms a void or space 10 between the side of the teat and the head. At the discharge end 4 of the cup, the liner has a discharge passageway 4a communicating with a flexible, short milk tube 11 which connects the teat cup to a clawpiece (not shown) of the milking cluster and via which vacuum is applied to the inside of the liner for removing, from the cup, milk discharged by the teat during the milking cycle. By way of example, the shell 2 may be produced from stainless steel or plastics material and the liner 3 may be moulded from resilient plastics, synthetic rubber or silicone.

As will be appreciated by those skilled in the art, the cup 1 is fitted with suitable means (not shown) for connecting the space 12 between the shell 2 and the liner 3, via the clawpiece, to the associated milking point which has control means for alternately supplying vacuum pulses and venting the space 12 to atmosphere in order to cause the liner 3 to flex against the teat and stimulate a milking operation. The vacuum is supplied from a common source connected to the milking point by a manifold assembly of the milking equipment.

Extending into the inside of the head 6 of the liner, and into the cavity 9, is an injection nozzle 13 which is integral with a tube 14 for delivering fluid to the nozzle. This tube extends down the outside of the teat cup, to which it may be secured in any convenient manner, and has its distal end coupled, via the housing of a shut-off valve 20 (more fully described below), to a control valve system for selectively connecting the nozzle to supplies of disinfectant, conditioner, washing water and compressed air. The injection nozzle 13 is configured so as to direct fluid discharged from the nozzle inwardly and downwardly into the interior of the barrel 8 of the liner, as viewed in FIGS. 1 and 2.

The discharge end 4 of each teat cup liner is coupled to the associated short milk tube 11 by a shut off valve 20. The latter comprises a valve body 21 having a milk passageway 22 therethrough, opposite ends of which terminate in spigots 23,24 connecting the milk passageway to the discharge passageway 4a of the teat cup liner and the short milk tube, respectively. The valve body 21 has a cylindrical valve chamber 25 to one side of the milk passageway 22 which is connected to the latter via a circular opening 26. A valve member 27 moulded from flexible membrane material, such as, rubber, silicone or other elastomeric material, forms a seal between the chamber 25 and the opening 26. The membrane valve member 27 is moulded in a cylindrical cap-like shape having its cap portion 27a projecting into the chamber 25 and the cavity in the cap portion facing the milk passageway 22, when in the unactuated position shown in FIG. 1. This valve member is fastened in position by an outwardly projecting radial flange 28 about the mouth of its cavity trapped between mating parts of the valve body. The valve chamber 25 is selectively connectable to a source of pneumatic pressure or vacuum for controlling the valve member 27 via a port 29 in the wall of the chamber which has its external end connected to a flexible pneumatic tube 30 coupling the port to the source of pneumatic pressure or vacuum. A pressure sensor (not shown) may monitor the pressure in the valve chamber 25 for detecting possible malfunction of the membrane valve member 27. A recess 31 is formed about the internal wall of the milk passageway 22 adjacent the valve chamber 25 for locating the valve member 27 when the latter is extended across the passageway in its actuated position.

The valve body 21 of the shut-off valve serves as a fixing point for the distal end of the delivery tube 14 for the injection nozzle 13. At its distal end, the delivery tube is coupled to a fluid passageway 32 formed through the valve body and having its inlet end 33 connected to a fluid supply tube 34 connected to the valve control system for selectively connecting the nozzle to supplies of treatment and cleansing fluid and compressed air. The inlet end 33 of the passageway 32 includes a pressure differential responsive, non-return valve 35, typically, a duck bill valve, which prevents a higher vacuum occurring within the head of one teat cup, as a result of the vacuum applied for extracting milk, from affecting the vacuum in another one of the cups, when there is a difference in the degree of vacuum occurring within the heads of the teat cups.

Formed through the wall of the valve body 21 immediately upstream of the location recess 31 is a drain port 37 for enabling fluid trapped by the shut-off valve to drain from the valve. This port is controlled by a non-return flap valve 38 mounted on the valve body at the external end of the drain port 37.

Sanitising, rinsing and drying fluids, such as disinfecting and conditioning liquid, water and compressed air, as well as compressed air and vacuum for providing pneumatic control signals, are supplied to each milking point, from common sources, by a manifold system. At each milking point, a stall control unit incorporating solenoid operated valves selectively supplies the fluids from the manifold system to the teat cups 1, via a distributor mounted on the clawpiece and flexible tubing connecting the distributor to the teat cups. The clawpiece also serves to distribute pneumatic milking pulses derived from suitable sources to the spaces 12 in the teat cups for milking purposes. The apparatus for generating and supplying the pneumatic milking pulses is conventional and, since it forms no part of the present invention, it will not be described in detail.

When a milking point is to be operated to milk a cow, for example, the stall control unit is actuated to apply vacuum to the short milk tubes 11 of the associated milking cluster and the teat cups 1 are fitted to the cow's teats T. When fitted, the teat cups are attached in the positions generally illustrated in FIGS. 1 and 2 with their heads 5 uppermost. The vacuum applied to the short milk tubes extracts, from the teat cups, milk discharged into the teat cup liners 3 from the engaged teats. It is also applied via the liner barrels, to the voids 10 between the teats and the heads 6 of the liners and serves to capture the cups on the teats. Vacuum and atmospheric pressure are then alternately applied in pulses to the space 12 between the liner and the shell of each teat cup in order to flex the liner against the teat and stimulate milking. These pneumatic pulses are alternately applied to pairs of the teat cups. Milk is extracted from each teat cup, via its discharge passageway 4a, the associated shut off valve 20 and the short milk tube 11, by the vacuum applied through the claw device. This vacuum also retains the non-return flap valves 38 in the closed condition so that milk cannot bleed through the drain port 37.

During the milking cycle, the shut off valves 20 are in the open position, as illustrated in FIG. 1. Also, during the milking cycle, clean filtered air, at atmospheric pressure, is admitted into the head of the liner, via the delivery tube 14 and the injection nozzle 13, under the control of a vacuum control valve disposed in the stall control unit and upstream of the non-return valves 35, in order to avoid the occurrence of excessive vacuum in the liner head and the risk of the liner creeping up the teat with resultant discomfort to the animal.

When the milking cycle is to be terminated, which is detected by a milk flow meter of the stall control unit as a reduction of milk flow below a predetermined level, the automatic cluster remover is signaled to take off the cluster from the cow's udder and, also, the programmable electronic circuit board of the stall control unit is signaled to commence the treatment and cleansing cycle. The valve system of the milking equipment maintains the supply line to the stall control unit primed with disinfectant so that, when the system is actuated to supply disinfectant to the tubes 34, disinfectant is supplied and distributed to the injection nozzles 13 in the liner heads of the teat cups with minimum delay and can be delivered at low pressure. The injection of this fluid is timed to occur upon or immediately prior to actuation of the cluster remover. Removal of the cluster from the teats may be aided by delivering pulses and/or a charge of low-pressure compressed air to the injection nozzles 13 and into the void 10 in each cup. In any event, as the cups are removed, disinfectant is discharged into each void 10 from the associated nozzle, spreads about the void and is wiped down the outside of each teat, thus ensuring that the whole teat is hygienically coated with disinfecting liquid. Because the fluid is injected at low pressure and because it is contained within the voids 10 as the cups are removed from the teats, this alleviates the problem of fluid vapour or mist in the surrounding environment and consequent health risks. Prior to full take off, compressed air is applied to the shut-off valves 20 via the pneumatic tubes 30, to actuate or extend the membrane valve members 27. As illustrated in FIG. 2, upon the application of air pressure, each valve member is turned inside out so as to project across the milk passageway 22 and is expanded or inflated so as to seal with the recess 31. This blocks the associated milk passageway and shuts-off fluid flow therethrough for the remainder of the treatment and cleansing cycle. Preferably, a pressure sensor monitors the shut-off valves to sense whether or not the valve members have operated correctly. If they have not, the associated milking cluster is shut down in conjunction with the actuation of an alarm.

Following actuation of the shut off valves 20 and take off, the teat cups 1 naturally fall into a rest position in which they hang downwardly from the short milk tubes 11 and in an inverted position with their heads downwardly, as illustrated in FIG. 3. When the teat cups fall into this downwardly hanging position, the control valve system connected to the supply tubes 34 is actuated so as, for example, sequentially to deliver two pulses of water, a pulse of disinfectant, such as iodine, two further pulses of water and then compressed air to the nozzles 13. Nozzles 13 spray these various fluids upwardly into the barrels 8 and towards the the discharge passageways 4a of the teat cup liners. The first two pulses of water flush the liners to wash away milk residue, soil and traces of the original disinfectant. The subsequent pulse of disinfectant is used to disinfect the liners and thereafter the pulses of water and compressed air wash away the disinfectant and dry the liners preparatory to the next milking cycle. Subsequent to the air drying pulses, vacuum is applied to the pneumatic lines 30 of the teat cups in order to retract the membrane valve members 27 from the milk passageways 22 into the valve chambers 23 and restore the valve members to the position shown in FIG. 1.

Because vacuum is no longer applied to the milk passageways 22 to withdraw milk from the teat cups when the milking cycle is terminated, the pressure in the milk passageways above the extended membrane valve members 27 returns to atmospheric pressure and the flap valves 38 are free to open. This provides the facility for any fluid to drain away if a teat cup, for some reason, becomes entangled and is prevented from falling over upon take off and is held in a partially upright position.

Whilst a particular embodiment has been described, it will be understood that modifications can be made without departing from the scope of the invention as defined by the appended claims. For example, because the treatment and cleansing fluids are injected through a nozzle 13 in the head of the teat cup liner 3 and the treatment and cleansing etc of the interior of the teat cup is performed with the teat cup in a head down position so that the fluids drain through the mouth 7, it is not essential to position a shut-off valve, such as valve 20, at the discharge end 4 of the teat cup or in the associated short milk tube 11. This is because the short milk tube and the spigot connecting the short milk tube to the clawpiece are typically designed to cooperate and shut-off fluid flow from the short milk tube into the clawpiece when the teat cup hangs from the spigot in its rest position The teat cup may be fitted with more than one nozzle 13 for injecting fluid into the cavity 9 in the head 6 of the liner 3 and these nozzles may be supplied via one or more fluid delivery tubes 14. Whilst, in the embodiment described, the fluid delivery tube 14 is a separate tube, it may alternatively be integrated with the head. It may, for example, extend between the shell 2 and the liner 3.

The invention claimed is:

1. A teat cup for stimulating discharge of milk from an animal's teat in a milking operation, comprising:
    a shell supporting a flexible liner for engaging about a teat of an animal to be milked;
    a head portion at one end of said flexible liner having a mouth through which said teat is engageable with said flexible liner;
    a milk discharge passageway at an opposite end of said flexible liner;
    at least one nozzle for discharging treatment fluid into the head portion of said flexible liner upon termination of said milking operation;
    said at least one nozzle being within said head portion of said flexible liner and configured to discharge treatment fluid internally into said head portion;
    a delivery tube and a fluid supply tube collectively adapted to supply liquid treatment and other treatment fluids;
    said at least one nozzle connected to and being in fluid communication with said delivery tube; and
    a non-return valve via which treatment fluid is supplied to said at least one nozzle, said non-return valve being disposed within a valve chamber and positioned intermediate said at least one nozzle and said fluid supply tube,
    wherein:
        said non-return valve and said delivery tube are attached to or integral with the teat cup; and
        said non-return valve is configured, via said delivery tube, to, during milking, prevent a higher vacuum occurring within a head portion of another one of said plurality of teat cups, from affecting a lower vacuum occurring within said head portion of said teat cup.

2. The teat cup of claim 1, wherein said at least one nozzle extends into an internal annular cavity within said head portion of said flexible liner.

3. The teat cup of claim 2, wherein, when the teat cup is engaged with the animal's teat, said internal annular cavity forms a void between said teat and said head portion, and wherein said at least one nozzle is arranged to discharge treatment fluid into said cavity in said head portion.

4. The teat cup of claim 1, wherein said at least one nozzle is configured to direct treatment fluid towards said discharge passageway of said flexible liner.

5. A milking cluster comprising a plurality of the teat cups, each of which is constructed as claimed in claim 1, a plurality of short milk tubes respectively connecting said discharge passageways of said teat cups to a clawpiece which collects milk discharged from said teat cups preparatory to onward delivery.

6. Milking equipment comprising:
    at least one milking cluster including a plurality of teat cups;
    each of said teat cups comprising a shell supporting a flexible liner for engaging about a teat of an animal to be milked, said flexible liner having a head portion at one end provided with a mouth through which said teat is engageable with said flexible liner, a milk discharge passageway at the opposite end thereof;
    at least one nozzle for discharging treatment fluid into said head portion of each said flexible liner upon termination of a milking stage;
    said at least one nozzle being within said head portion of each said flexible liner and configured to discharge treatment fluid internally into said head portion;
    a delivery tube and a fluid supply tube collectively adapted to supply liquid treatment and other treatment fluid to said at least one nozzle, said delivery tube being connected to and in fluid communication with said at least one nozzle; and
    a non-return valve via which said treatment fluid is supplied to said at least one nozzle, said non-return valve being disposed within a valve chamber and positioned intermediate said at least one nozzle and said fluid supply tube, wherein said non-return valve and said delivery tube are attached to or integral with the teat cup, and wherein said non-return valve is configured, via said delivery tube, to, during milking, prevent a higher vacuum occurring within a head portion of another one of said plurality of teat cups, from affecting a lower vacuum occurring within said head portion of said teat cup;

a plurality of short milk tubes respectively connecting said discharge passageways of said teat cups to a clawpiece which collects milk discharged from said teat cups for onward delivery;

a cluster remover for effecting take-off of said milking cluster from said animal's teats; and control means for initiating supply of treatment fluid to said nozzles of said teat cups upon take-off so that withdrawal of said teat cups wipes said treatment fluid down said teats.

7. The milking equipment of claim 6, wherein said at least one nozzle of each said teat cup extends into an internal annular cavity within said head portion of the associated flexible liner and is configured to direct treatment fluid towards said discharge passageway of said associated flexible liner.

8. The milking equipment of claim 7, wherein said at least one nozzle of each said teat cup comprises a single nozzle directed into said internal annular cavity within said head portion of the associated flexible liner.

9. The milking equipment of claim 6, including a shut-off valve connected to said discharge passage of each said teat cup for shutting off treatment fluid flow from said teat cup to said clawpiece.

10. The milking equipment of claim 9, including a drain port on the upstream side of said shut-off valve for enabling trapped treatment fluid to drain from the associated flexible liner in the event of said teat cup being held in a position in which said head portion of said flexible liner is uppermost, said drain port being controlled by another check valve.

* * * * *